(12) United States Patent
Evulet

(10) Patent No.: US 11,396,896 B2
(45) Date of Patent: Jul. 26, 2022

(54) VARIABLE GEOMETRY THRUSTER

(71) Applicant: Jetoptera, Inc., Mason, OH (US)

(72) Inventor: Andrei Evulet, Mason, OH (US)

(73) Assignee: JETOPTERA, INC., Edmonds, WA (US)

( * ) Notice: Subject to any disclaimer, the term of this patent is extended or adjusted under 35 U.S.C. 154(b) by 380 days.

(21) Appl. No.: 15/685,975

(22) Filed: Aug. 24, 2017

(65) Prior Publication Data

US 2018/0058483 A1 Mar. 1, 2018

Related U.S. Application Data

(60) Provisional application No. 62/380,108, filed on Aug. 26, 2016, provisional application No. 62/379,711, filed on Aug. 25, 2016.

(51) Int. Cl.
| | |
|---|---|
| *F02K 1/38* | (2006.01) |
| *F02K 1/28* | (2006.01) |
| *F02C 6/08* | (2006.01) |
| *F02K 3/04* | (2006.01) |
| *F15D 1/08* | (2006.01) |
| *B64C 29/04* | (2006.01) |
| *F15D 1/00* | (2006.01) |
| *B64C 15/14* | (2006.01) |
| *B60F 5/02* | (2006.01) |

(52) U.S. Cl.
CPC ............ *F15D 1/08* (2013.01); *B64C 15/14* (2013.01); *B64C 29/04* (2013.01); *F02C 6/08* (2013.01); *F02K 1/28* (2013.01); *F02K 1/386* (2013.01); *F15D 1/007* (2013.01); *F15D 1/008* (2013.01); *B60F 5/02* (2013.01); *F02K 3/04* (2013.01); *F05D 2220/323* (2013.01); *F05D 2240/10* (2013.01); *F05D 2260/606* (2013.01); *F05D 2270/173* (2013.01)

(58) Field of Classification Search
CPC ..... F02K 1/28; F02K 1/46; F02K 1/30; F02K 1/38; B64C 15/00
See application file for complete search history.

(56) References Cited

U.S. PATENT DOCUMENTS

| | | | |
|---|---|---|---|
| 3,370,794 A | 2/1968 | Drewry et al. | |
| 3,525,474 A * | 8/1970 | Mills ..................... | F02C 7/057 239/265.17 |

(Continued)

OTHER PUBLICATIONS

International Search Report and Written Opinion, International Application No. PCT/US2017/048479, dated Nov. 6, 2017, pp. 12.

*Primary Examiner* — Arun Goyal
*Assistant Examiner* — Henry Ng
(74) *Attorney, Agent, or Firm* — PG Scott Born; Foster Garvey PC

(57) ABSTRACT

A propulsion system coupled to a vehicle. The system includes a diffusing structure and a conduit portion configured to introduce to the diffusing structure through a passage a primary fluid produced by the vehicle. The passage is defined by a wall, and the diffusing structure comprises a terminal end configured to provide egress from the system for the introduced primary fluid. A constricting element is disposed adjacent the wall. An actuating apparatus is coupled to the constricting element and is configured to urge the constricting element toward the wall, thereby reducing the cross-sectional area of the passage.

11 Claims, 6 Drawing Sheets

(56) References Cited

U.S. PATENT DOCUMENTS

| | | | | |
|---|---|---|---|---|
| 3,694,107 | A | * | 9/1972 | Stein ..................... F04F 5/46 |
| | | | | 417/167 |
| 3,795,367 | A | * | 3/1974 | Mocarski .............. B05B 7/0416 |
| | | | | 239/265.17 |
| 3,942,463 | A | | 3/1976 | Johnson, Jr. et al. |
| 4,192,461 | A | * | 3/1980 | Arborg ................... B63H 11/02 |
| | | | | 114/151 |
| 4,448,354 | A | | 5/1984 | Reznick et al. |
| 4,815,942 | A | | 3/1989 | Alperin et al. |
| 5,996,936 | A | | 12/1999 | Mueller |
| 7,793,504 | B2 | * | 9/2010 | Baker ...................... F02K 1/16 |
| | | | | 60/770 |
| 2010/0192715 | A1 | * | 8/2010 | Vauchel ................. F02K 1/763 |
| | | | | 74/89.35 |
| 2011/0215204 | A1 | * | 9/2011 | Evulet .................... B64D 33/02 |
| | | | | 244/53 B |
| 2012/0145808 | A1 | * | 6/2012 | Winkler ................... F02K 1/30 |
| | | | | 239/265.35 |
| 2014/0053815 | A1 | * | 2/2014 | Sperry ................. F02M 21/042 |
| | | | | 123/527 |

* cited by examiner

VARIABLE GEOMETRY THRUSTER

PRIORITY CLAIM

This application claims priority to U.S. Provisional Application No. 62/379,711, filed Aug. 25, 2016, and U.S. Provisional Application No. 62/380,108, filed Aug. 26, 2016, the entire disclosures of which are hereby incorporated by reference as if fully set forth herein.

INCORPORATION BY REFERENCE

U.S. patent application Ser. No. 15/670,943 filed Aug. 7, 2017, U.S. patent application Ser. No. 15/654,621 filed Jul. 19, 2017, U.S. patent application Ser. No. 15/221,389, filed Jul. 27, 2016, U.S. patent application Ser. No. 15/221,439, filed Jul. 27, 2016, and U.S. patent application Ser. No. 15/256,178, filed Sep. 2, 2016 are hereby incorporated by reference in their entireties as if fully set forth herein.

COPYRIGHT NOTICE

This disclosure is protected under United States and International Copyright Laws. © 2017 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

It has been demonstrated in tests that conditions in which there is less than optimal primary fluid flow supplied to an ejector/thruster, the operation in the round ends of the thruster or ejector remains very performant. However, the straight portion of the thruster is where the primary fluid injectors suffer a rapid performance degradation. Tests show that the efficiency of the thruster declined significantly with lower flow, yet measurements of the velocity of the mixed entrained/primary fluids efflux from the two ends of the thruster remain high even at low flows. In one test the velocity measured behind the round ends of the thruster at about one length of the ejector downstream of its exit plane remained in excess of 200 mph, whereas in the middle of the thruster corresponding to the straight or linear geometry, the velocity dropped to less than 100 mph. This is due to the specific flow pattern and the configuration of the rounded ends of the thruster in addition to the relative orientation of the emerging primary wall jets at non-parallel angles, facilitating the rapid entrainment and mixing with the ambient air, whereas the wall jets originating from the linear portion are parallel to each other and less efficient at lower flows.

BRIEF DESCRIPTION OF THE DRAWING FIGURES

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Figure 1:
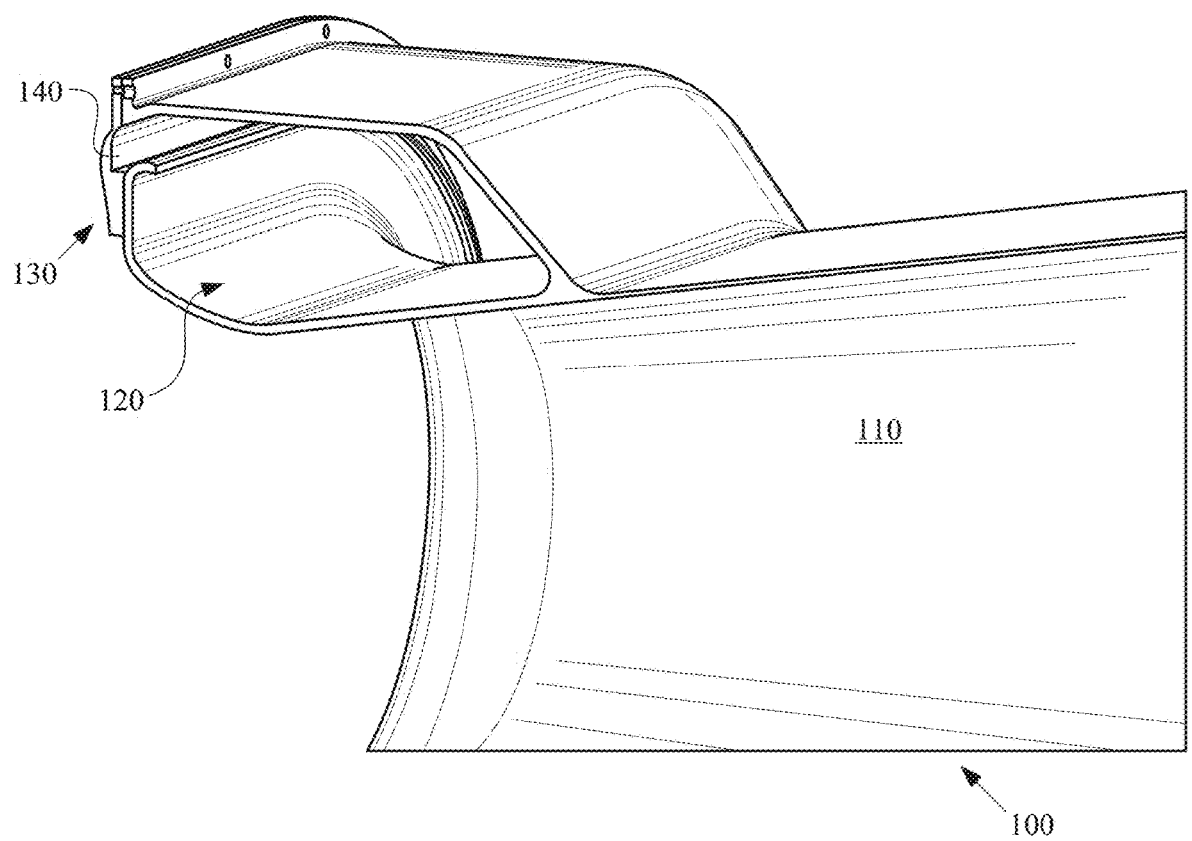
FIG. 1 illustrates a cross-sectional portion of a fixed-geometry thruster according to an embodiment.

FIG. 1 illustrates a cross-sectional portion of a fixed-geometry Coanda-type thruster 100 including diffusing structure 110. A conduit portion, such as primary fluid area plenum 120, is fixed in its geometrical configuration, making the local conditions of the primary fluid provided by the plenum and the entrainment of secondary fluid introduced via an intake structure 130 perhaps entirely dependent on the conditions of primary fluid delivery—pressures, flow rates and temperatures, for example. The performance of the thruster 100 depends on the upstream supply of the primary fluid and may have limited high efficiency at conditions matching the best entrainment and minimal losses. Thruster 100 includes a fixed shim 140 without fringes. Such a geometry may allow ideal performance at a given flow condition or mass flow rate, pressure and temperature combination of the primary fluid.

An embodiment includes a Coanda thruster that can change its primary fluid introduction conditions to match the flow conditions, thereby performing more efficiently and generating higher entrainment at conditions different from the ideal conditions described with regard to FIG. 1.

Figure 2:
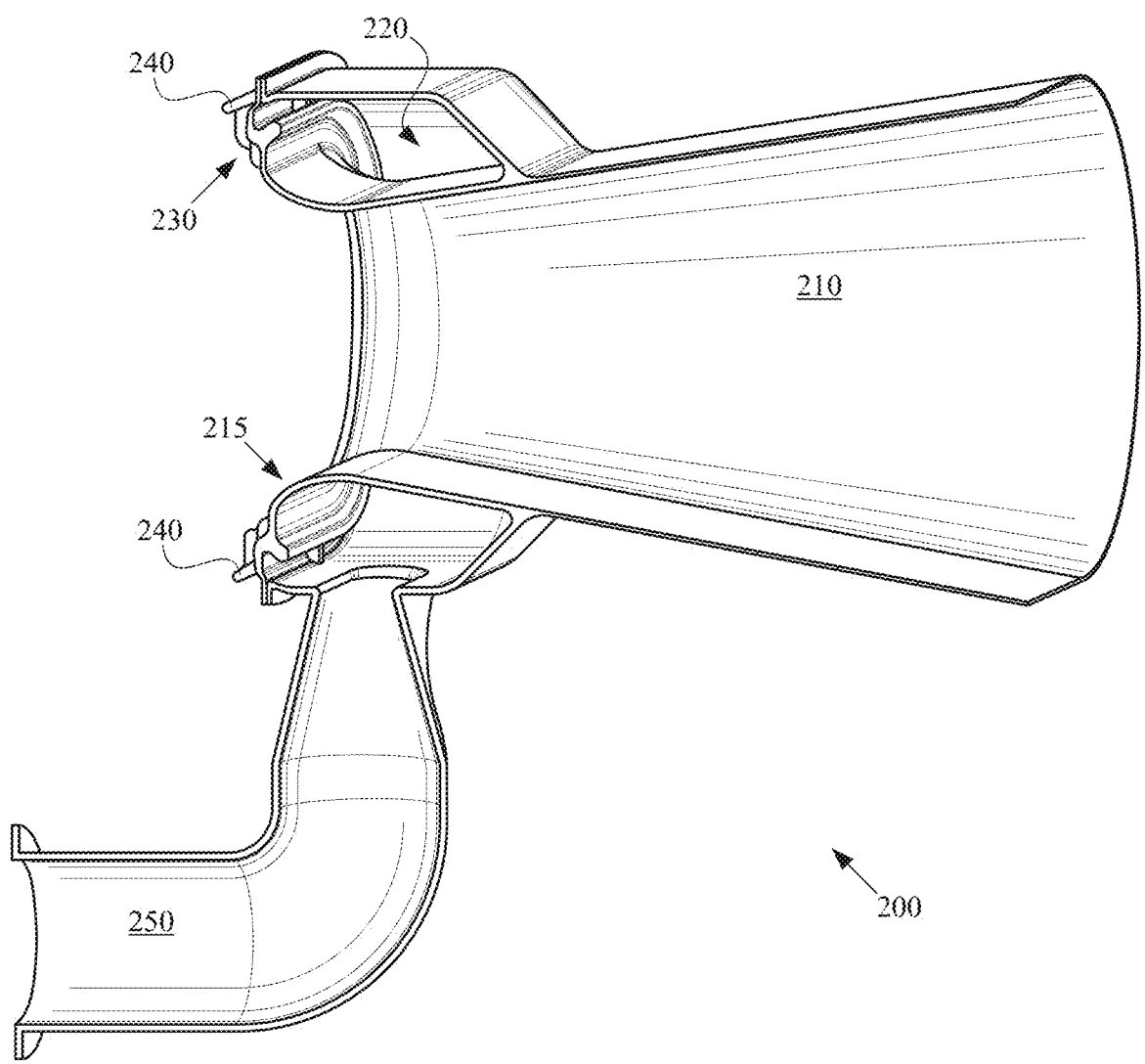
FIG. 2 illustrates a cross-sectional portion of a variable-geometry thruster according to an embodiment.
Figure 3:
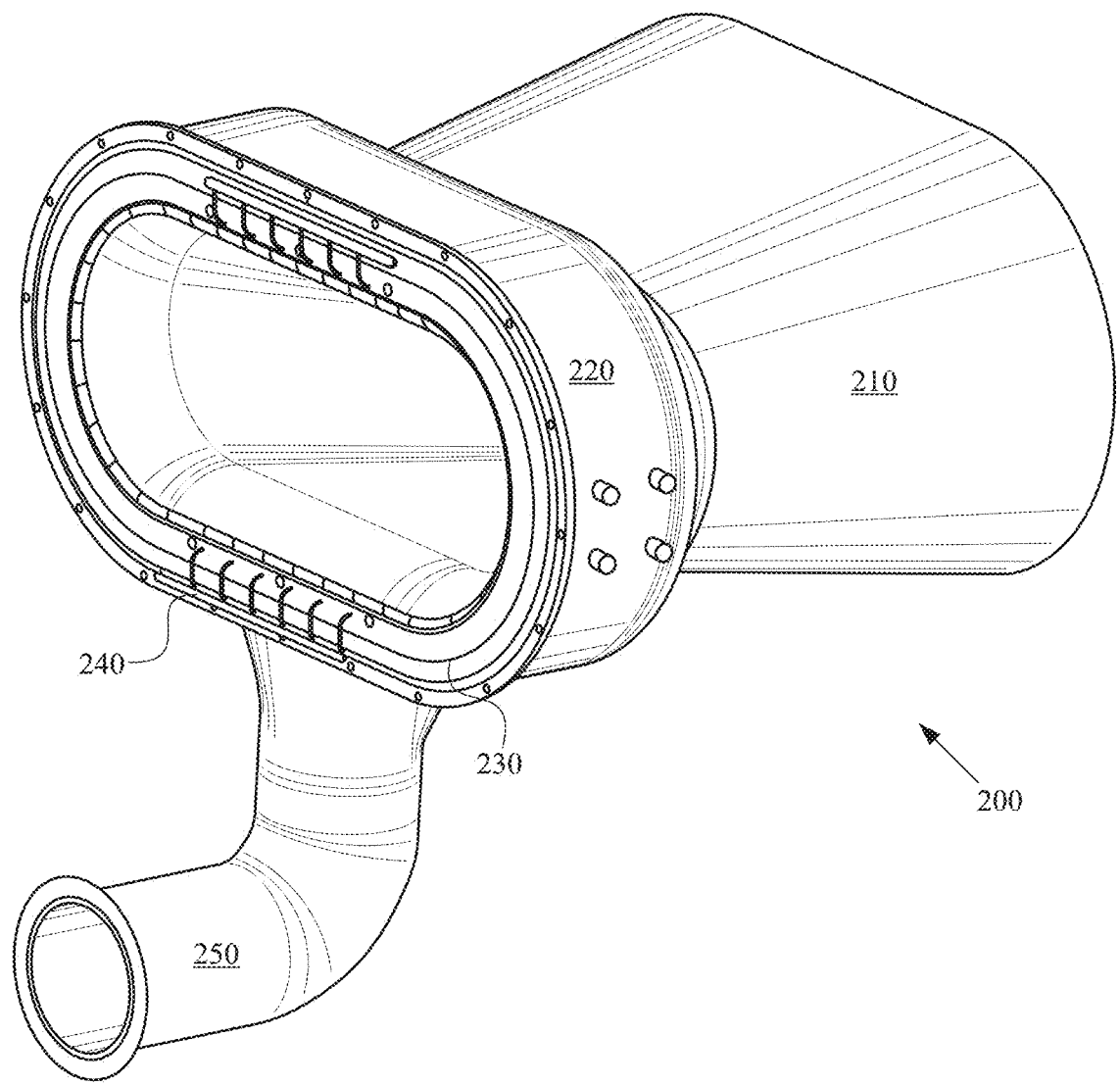
FIG. 3 illustrates a side perspective view of a variable-geometry thruster according to an embodiment.

Specifically, FIG. 2 illustrates in cross-section, and FIG. 3 illustrates in side perspective view, a Coanda-type thruster 200 according to an embodiment and similar to thruster 100 illustrated in FIG. 1. Thruster 200 includes a diffusing structure 210 and a conduit portion, such as primary fluid area plenum 220. Plenum 220 supplies primary fluid, and an intake structure 230 provides secondary fluid, such as ambient air, to the diffusing structure 210 for mixing of the primary and secondary fluids therein. The diffusing structure 210 comprises a terminal end configured to provide egress from the thruster 200 for the mixed primary and secondary fluids. More particularly, and in an embodiment, plenum 220 introduces the primary fluid to a convex Coanda surface 215. The primary fluid may consist of, for non-limiting example, compressor bleed air from a turbojet or pressurized exhaust gas from a gas generator delivered to plenum 220 via a primary-fluid source, such as a duct 250. Thruster 200 further includes a flow controller 240 discussed in greater detail below herein.

Figure 4:
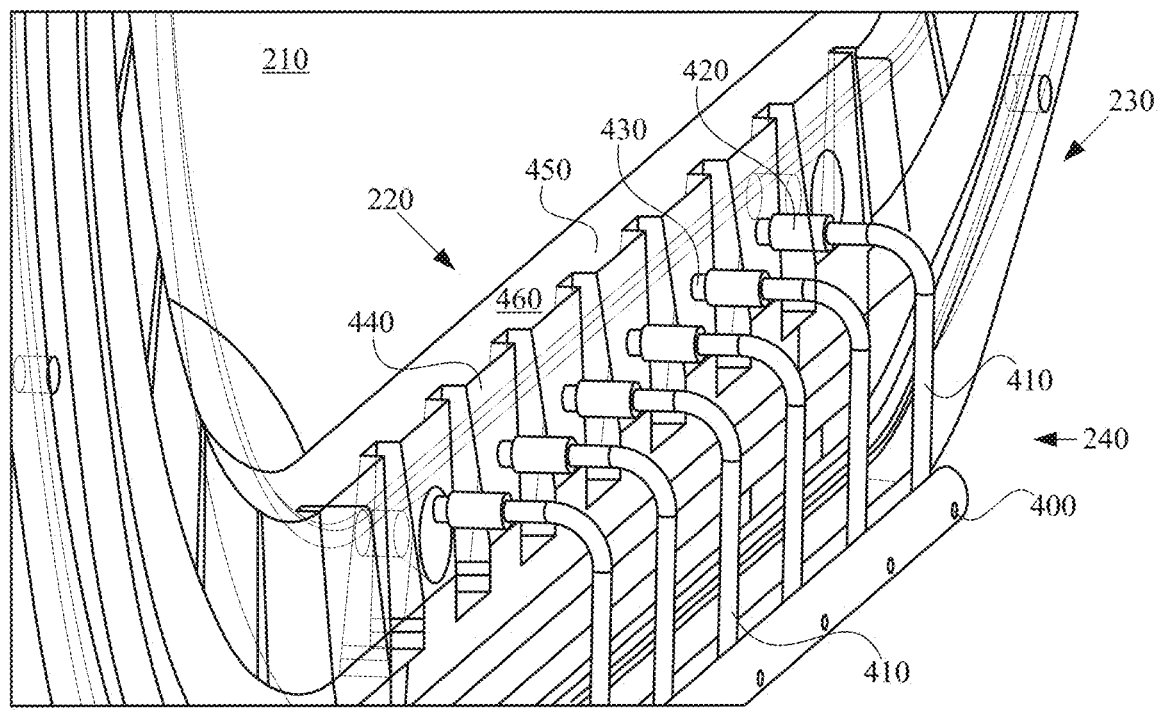
FIG. 4 illustrates a side perspective view of variable-geometry components according to an embodiment.

Referring now to FIG. 4, and in an embodiment, plenum 220 introduces the primary fluid to the diffusing structure 210 through a series of passages 450. Each passage 450 is defined at least in part by a respective wall portion 460. Flow controller 240 includes a series of constricting elements, such as shims 440, disposed adjacent a corresponding one of the wall portions 460. The shims 440 may be manufactured out of a metal material flexible enough and thin enough to withstand multiple cycles of the operation.

Flow controller 240 further includes an actuating apparatus coupled to the shims 440. The actuating apparatus is configured to urge the shims 440 toward their corresponding wall portion 460, thereby reducing the cross-sectional area of each associated passage 450. Additionally, the actuating apparatus may be configured to actively withdraw the shims 440 away from their corresponding wall portion 460, thereby increasing the cross-sectional area of each associated passage 450.

In the embodiment illustrated in FIG. 4, the actuating apparatus includes a primary lever 400 coupled to a series of secondary levers 410, each of which is coupled to a corresponding bushing 420. Each bushing 420 is, in turn, coupled to a corresponding threaded pin 430 engaged with threaded slots formed in the intake structure 230. A tip of each pin 430 abuts a corresponding one of the shims 440 so as to enable deflection of the shims toward their corresponding wall portion 460.

Figure 5:
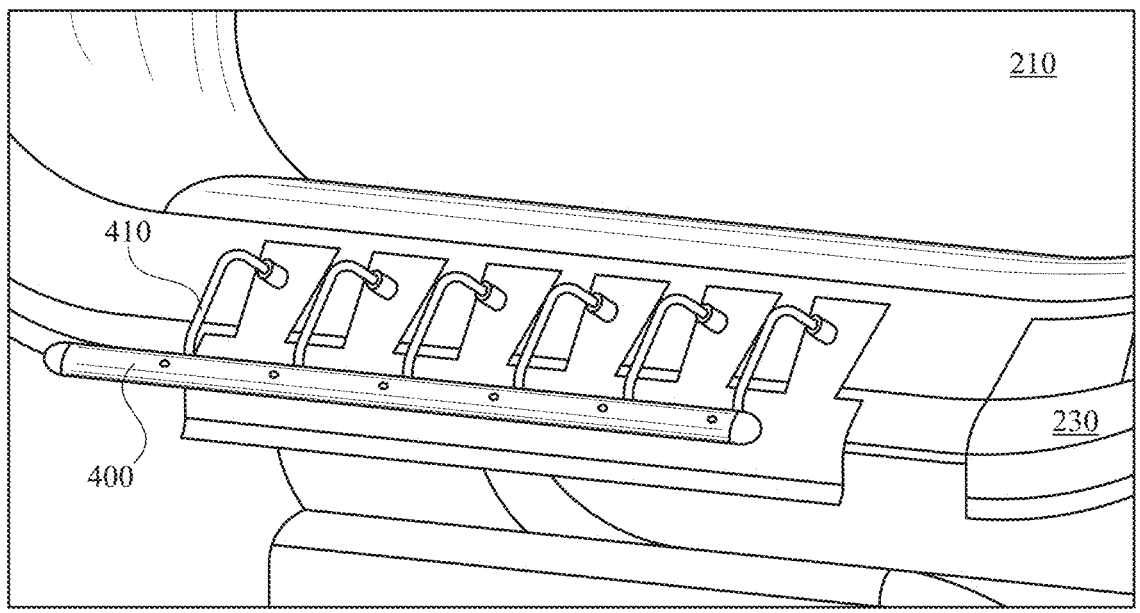
FIG. 5 illustrates a side perspective view of the variable-geometry components in fully open state according to an embodiment.
Figure 7:
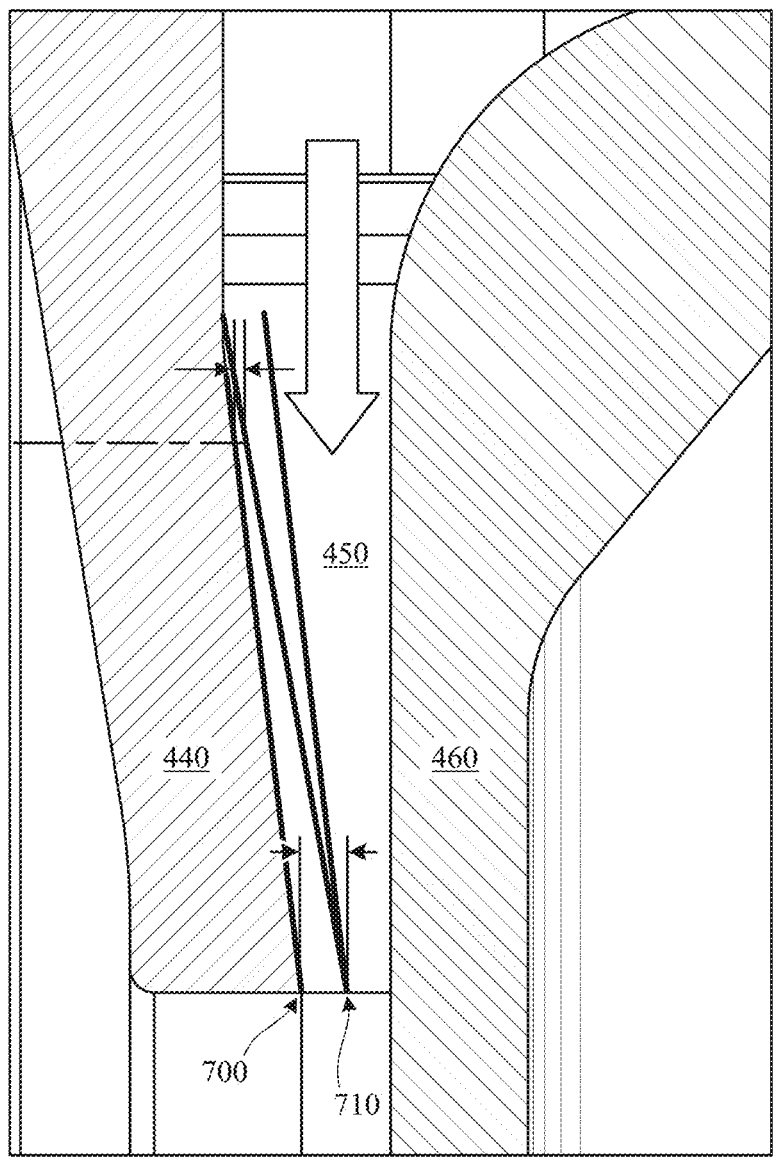
FIG. 7 illustrates a side cross-sectional view of variable-geometry components and a primary fluid passage according to an embodiment.

As shown in FIG. 5, when the actuating apparatus is in a fully open state, shims 440 have not been deflected by pins 430 toward walls 460 and are at position 700 as illustrated in FIG. 7. Consequently, passage 450 is at its maximum cross-sectional area and flow of the primary fluid therethrough into diffusing structure 210 is minimally constricted.

Figure 6:
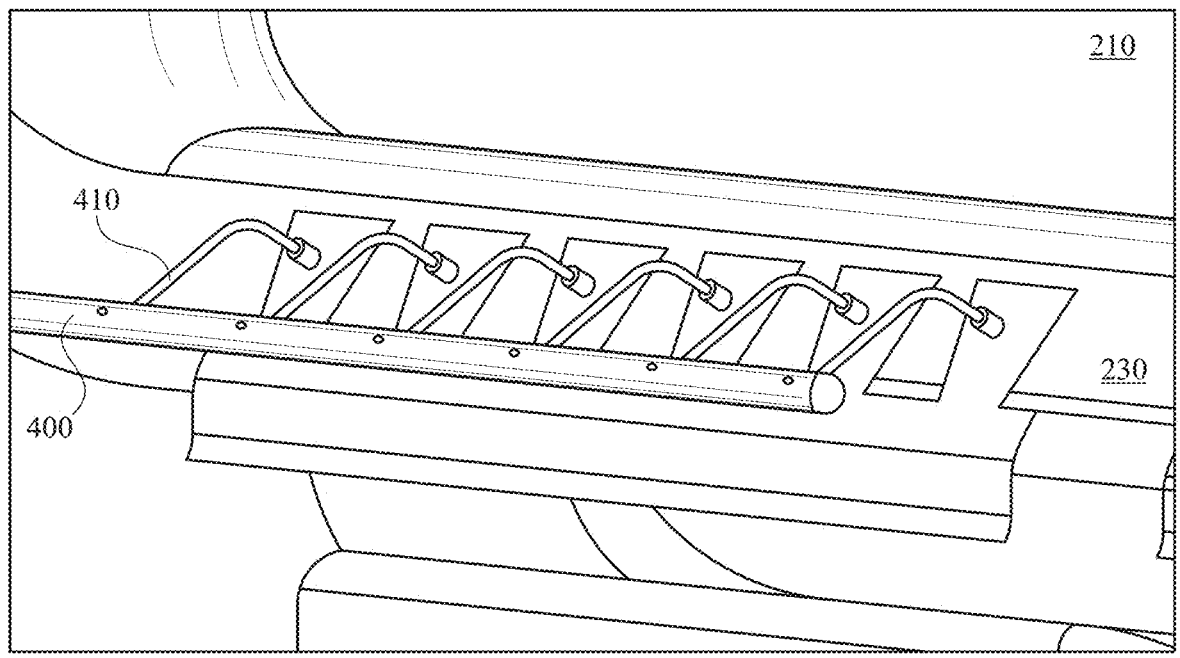
FIG. 6 illustrates a side perspective view of the variable-geometry components in constricting state according to an embodiment.

As shown in FIG. 6, when a force generator (not shown) applies a predetermined motive force to primary lever 400 moving the primary lever horizontally a corresponding predetermined distance, torque is applied to each of the secondary levers 410. In response to this applied torque, secondary levers 410 rotate, thereby causing translational movement of the tips of pins 430 toward wall portions 460. In turn, shims 440 are deflected by pins 430 toward wall portions 460 and are at position 710 as illustrated in FIG. 7. Consequently, the cross-sectional area of passage 450 is decreased and flow of the primary fluid therethrough into diffusing structure 210 is constricted, and thusly accelerated, to a predetermined degree. Additionally, the injection velocity of the primary fluid at the wall jet emergence into the ejector 200, which controls the Coanda effect and the entrainment ratio, increases, and high performance is maintained even at lower flow rates.

The local increase in velocity decreases the static pressure per Bernoulli's principle, allowing more air to be entrained from the ambient and resulting in a larger mass flow compared to the fixed-geometry thruster at similar conditions of primary mass flow rate, pressure and temperature.

For instance, a turbine gas generator producing 1 kg/sec of combustion gas at a temperature of 1000 K and 2 bar pressure at 100,000 RPM and supplying a thruster-ejector designed for these conditions with the primary fluid produces 150 lbf of thrust. However, the same gas generator working at 85,000 RPM speed produces only 0.75 kg/s of combustion gas at 950 K and 1.4 bar and the performance of the fixed geometry primary fluid passage determines a drop in thrust to 100 lbf. The main reason for it is the reduction of the emerging velocity of the primary fluid into the entrainment area, determining a higher local static pressure and therefore less entrainment happens. The changing (reduction) of the primary area to determine a higher local primary fluid emerging velocity, and according to Bernoulli principle a lower static pressure, increases significantly the entrainment ratio and the thrust to 120 lbf, mainly due to an increase of 20% in the entrained air.

For those familiar with the subject, the isentropic expansion of the primary fluid jet results in the ideal thrust value of:

$$F_i = \dot{W} \times \sqrt{\left[\frac{2\gamma}{\gamma - 1} \times R_u \times T \times \left(1 - \left(\frac{P_\infty}{P_{t,j}}\right)^{\left(\frac{\gamma-1}{\gamma}\right)}\right)\right]}$$

Where $\dot{W}$ is the mass flow rate of the primary fluid, $\gamma$ is the specific heat coefficient, $R_u$ is the universal gas constant and T is the temperature, while P are pressures corresponding to the ambient and the total pressure of the flow. By augmentation ratio, we refer to the ratio between the measured thrust and the formula above, calculated for the respective parameters at hand.

The ability of changing the cross-sectional area of passages 450 is thusly beneficial, improving the overall performance of an otherwise fixed geometry thruster designed for optimal operation only at a certain condition of the primary fluid (flow, temperature, pressures).

In one embodiment the shims 440 may be manufactured out of stainless steel or any other material that can withstand high temperatures of up to 1750 F and still retain elasticity and a life of at least 2000 cycles.

The mechanism of moving the pins 430 to reduce the passage 450 area and optimize the flow may be mechanical in character. However, other actuation mechanisms could be employed. In an alternative embodiment, a manifold (not shown) may be employed to provide compressed air from a source, such as a compressor or any other high pressure source, to actuate the pins 430 to urge the shims 440 into the flow. Alternatively, electric or magnetic actuators (not shown) could be used to perform the same function. In yet another embodiment, a mechanism that contains linear and semicircular actuators (not shown) is employed to enable the change in geometry of various segments or slot blocks of the thruster, adapting it to the conditions at hand.

In another embodiment, the deflection of shims 440 may be such that the mechanism completely blocks the flow into all passages, shutting off the flow and cancelling thrust generation at various stages of the flight of a vehicle. In yet another embodiment, the preferential shutting off of portions of the primary slots is employed to generate a vectored thrust to reduce the landing distance of an flying vehicle. In yet another embodiment, the thruster is used to balance a tailsitter in a symmetrical deployment (i.e., two or more thrusters on the plane or aerial vehicle) and the actuation of the shims 440 allows attitude control of the aircraft in hovering or take off or landing. In yet another embodiment, a flying car hover is enhanced by employing the variable geometry feature of the thrusters to control its attitude/speed and can be used for landing or take off or level flight.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. For example, in one embodiment, thruster 200 can be integrated into the induction track between an air filter and a throttle-body/carburetor, and upstream of a cylinder or combustion chamber, associated with an internal combustion engine. Alternatively, thruster 200 could be placed in an exhaust pipe downstream of the combustion chamber of an internal combustion engine. Accordingly, it should be understood that the methods and apparatus described herein are illustrative only and are not limiting upon the scope of the claims.

What is claimed is:

1. A propulsion system coupled to a vehicle, the propulsion system comprising:
   a diffusing structure;
   a conduit portion configured to introduce to the diffusing structure through a first passage a primary fluid produced by the vehicle, wherein the diffusing structure comprises a terminal end configured to provide egress from the propulsion system for the introduced primary fluid;
   a first constricting element disposed adjacent a first wall, the first passage being defined by the first wall and the first constricting element; and
   an actuating apparatus coupled to the first constricting element and configured to urge the first constricting element toward the first wall, thereby reducing a cross-sectional area of the first passage,
   wherein the actuating apparatus comprises:
   a first translating component configured to engage the first constricting element and configured to move translationally and perpendicularly relative to movement of the first constricting element; and
   a first rotational component coupled to the first translating component and the first constricting element,
   wherein movement of the first translating component rotates the first rotational component, thereby urging the first constricting element toward the first wall.

2. The propulsion system of claim 1, wherein the conduit portion is further configured to introduce the primary fluid to the diffusing structure through a second passage, the second passage being defined by a second wall,
   the propulsion system further comprises a second constricting element disposed adjacent the second wall, whereby the actuating apparatus is coupled to the second constricting element and configured to urge the second constricting element toward the second wall, thereby reducing a cross-sectional area of the second passage, and
   the actuating apparatus further comprises:
   a second translating component configured to engage the second constricting element and configured to move translationally;
   a second rotational component coupled to the second translating component and configured to move rotationally; and
   a lever element coupled to the first rotational component and the second rotational component and configured to rotate the first rotational component and the second rotational component in unison.

3. The propulsion system of claim 1, further comprising a convex surface coupled to the diffusing structure, wherein the conduit portion is configured to introduce the primary fluid to the convex surface through the first passage.

4. A propulsion system coupled to a vehicle, the propulsion system comprising:
   a diffusing structure;
   an intake structure coupled to the diffusing structure and configured to introduce to the diffusing structure a secondary fluid accessible to the vehicle, the intake structure including a conduit portion configured to introduce to the diffusing structure through a passage a primary fluid produced by the vehicle, the passage being defined by a wall, wherein the diffusing structure comprises a terminal end configured to provide egress from the propulsion system for the introduced primary fluid and secondary fluid;
   a first constricting element disposed adjacent the wall; and
   an actuating apparatus coupled to the constricting element and configured to urge the first constricting element toward the wall, thereby reducing a cross-sectional area of the passage,
   wherein the actuating apparatus comprises:
   a first translating component configured to engage the first constricting element and configured to move translationally and perpendicularly relative to movement of the first constricting element; and
   a first rotational component coupled to the first translating component and the first constricting element,
   wherein movement of the first translating component rotates the first rotational component, thereby urging the first constricting element toward the wall.

5. The propulsion system of claim 4, wherein the conduit portion is further configured to introduce the primary fluid to the diffusing structure through a second passage, the second passage being defined by a second wall,
   the propulsion system further comprises a second constricting element disposed adjacent the second wall, whereby the actuating apparatus is coupled to the second constricting element and configured to urge the second constricting element toward the second wall, thereby reducing a cross-sectional area of the second passage, and
   the actuating apparatus further comprises:
   a second translating component configured to engage the second constricting element and configured to move translationally;
   a second rotational component coupled to the second translating component and configured to move rotationally; and
   a lever element coupled to the first rotational component and the second rotational component and configured to rotate the first rotational component and the second rotational component in unison.

6. The propulsion system of claim 4, further comprising a convex surface coupled to the diffusing structure, wherein the conduit portion is configured to introduce the primary fluid to the convex surface through the passage.

7. The propulsion system of claim 4, wherein the primary fluid comprises compressor bleed air produced by a turbojet.

8. The propulsion system of claim 4, wherein the diffusing structure is positioned downstream of a turbine of a turbocharger of the vehicle, and the primary fluid is supplied by a compressor of the turbocharger.

9. A vehicle comprising
   a primary-fluid source;
   a diffusing structure;
   a conduit portion configured to introduce to the diffusing structure through a first passage a primary fluid produced by the source, wherein the diffusing structure comprises a terminal end configured to provide egress from the vehicle for the introduced primary fluid;

a first constricting element disposed adjacent a first wall, the first passage being defined by the first wall and the first constricting element; and an actuating apparatus coupled to the first constricting element and configured to urge the first constricting element toward the first wall, thereby reducing a cross-sectional area of the first passage, wherein the actuating apparatus comprises:

a first translating component configured to engage the first constricting element and configured to move translationally and perpendicularly relative to movement of the first constricting element; and a first rotational component coupled to the first translating component and the first constricting element, wherein movement of the first translating component rotates the first rotational component, thereby urging the first constricting element toward the first wall.

10. The vehicle of claim 9, wherein the conduit portion is further configured to introduce the primary fluid to the diffusing structure through a second passage, the second passage being defined by a second wall, the vehicle further comprises a second constricting element disposed adjacent the second wall, whereby the actuating apparatus is coupled to the second constricting element and configured to urge the second constricting element toward the second wall, thereby reducing a cross-sectional area of the second passage, and the actuating apparatus further comprises:

a second translating component configured to engage the second constricting element and configured to move translationally;

a second rotational component coupled to the second translating component and configured to move rotationally; and a lever element coupled to the first rotational component and the second rotational component and configured to rotate the first rotational component and the second rotational component in unison.

11. The vehicle of claim 9, further comprising a convex surface coupled to the diffusing structure, wherein the conduit portion is configured to introduce the primary fluid to the convex surface through the first passage.

* * * * *